United States Patent
Kim et al.

(10) Patent No.: US 11,385,880 B2
(45) Date of Patent: Jul. 12, 2022

(54) ELECTRONIC DEVICE FOR UPDATING FIRMWARE BY USING SECURITY INTEGRATED CIRCUIT AND OPERATION METHOD THEREOF

(71) Applicant: Samsung Electronics Co., Ltd., Suwon-si (KR)

(72) Inventors: Jinhyoung Kim, Suwon-si (KR); Sunjune Kong, Suwon-si (KR); Bumhan Kim, Suwon-si (KR); Taehoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/033,367

(22) Filed: Sep. 25, 2020

(65) Prior Publication Data

US 2021/0096837 A1 Apr. 1, 2021

(30) Foreign Application Priority Data

Sep. 27, 2019 (KR) .......................... 10-2019-0119815

(51) Int. Cl.
*G06F 8/61* (2018.01)
*G06F 21/44* (2013.01)
(52) U.S. Cl.
CPC ................ *G06F 8/61* (2013.01); *G06F 21/44* (2013.01)
(58) Field of Classification Search
CPC ......... H04L 9/3242; G06F 21/44; G06F 8/61; G06F 21/31; G06F 8/65; G06F 21/57
See application file for complete search history.

(56) References Cited

U.S. PATENT DOCUMENTS 7,747,997 B1 * 6/2010 Rao ........................... G06F 8/65
 717/170
8,539,553 B2 9/2013 Paas et al.
(Continued)

FOREIGN PATENT DOCUMENTS

EP 2704053 B1 9/2016
KR 10-2007-0017704 A 2/2007
(Continued)

OTHER PUBLICATIONS

International Search Report of the International Searching Authority in connection with International Application No. PCT/KR2020/012141 dated Dec. 4, 2020, 3 pages.

*Primary Examiner* — Marina Lee

(57) ABSTRACT

An apparatus and a method for updating firmware by using a security integrated circuit in an electronic device. An electronic device may include a security integrated circuit (IC) providing a rich execution environment and a secure execution environment. The security integrated circuit includes a main processor operating in the rich execution environment and a secure processor operating in the secure execution environment. The secure processor is configured to perform user authentication based on firmware update information received from a server through the main processor. If the user authentication is successful, authentication information is generated corresponding to the firmware update information and stored in at least a part of a secure memory. If the firmware is installed, authentication of the firmware is performed based on the authentication information stored in the secure memory, and if the authentication of the firmware is successful, the firmware is installed.

18 Claims, 13 Drawing Sheets

(56) References Cited

U.S. PATENT DOCUMENTS

| | | | |
|---|---|---|---|
| 2005/0195975 A1* | 9/2005 | Kawakita | H04L 9/0825 |
| | | | 380/30 |
| 2014/0229930 A1 | 8/2014 | Shroni et al. | |
| 2015/0199518 A1* | 7/2015 | Tokumoto | G06F 8/65 |
| | | | 713/187 |
| 2015/0220319 A1 | 8/2015 | Weiss et al. | |
| 2017/0078269 A1 | 3/2017 | Han et al. | |
| 2019/0179627 A1 | 6/2019 | Sugiyama et al. | |
| 2019/0253417 A1* | 8/2019 | Kim | G06F 15/7807 |
| 2021/0096836 A1* | 4/2021 | Okuno | G06F 8/61 |
| 2021/0224061 A1* | 7/2021 | Pillilli | G06F 21/572 |

FOREIGN PATENT DOCUMENTS

| | | |
|---|---|---|
| KR | 10-1083547 B1 | 11/2011 |
| KR | 10-1353063 B1 | 1/2014 |
| KR | 10-2019-0074857 A | 6/2019 |

* cited by examiner

ELECTRONIC DEVICE FOR UPDATING FIRMWARE BY USING SECURITY INTEGRATED CIRCUIT AND OPERATION METHOD THEREOF

CROSS-REFERENCE TO RELATED APPLICATION

This application is based on and claims priority under 35 U.S.C. 119 to Korean Patent Application No. 10-2019-0119815 filed on Sep. 27, 2019 in the Korean Intellectual Property Office, the disclosure of which is herein incorporated by reference in its entirety.

BACKGROUND

1. Field

Various embodiments relate to an apparatus and a method for updating firmware by using a security integrated circuit in an electronic device.

2. Description of Related Art

Through the development of information and communications technology and semiconductor technology, various types of electronic devices have developed into multimedia devices providing various multimedia services. For example, the multimedia services may include at least one of a voice call service, message service, broadcasting service, wireless Internet service, camera service, electronic payment service, or music playback service.

As the services provided through electronic devices become more diverse, the amount of personal information stored in the electronic devices is increasing. For example, personal information stored in an electronic device may include information requiring a security configuration, such as payment information, and information related to a certificate and credentials.

SUMMARY

Personal information stored in electronic devices may be leaked to the outside due to various types of attacks. For example, the various types of attacks may include an insider attack. For example, an insider attack may include an attack method in which, when a binary including a personal information releasing function is signed with a valid signature key and is installed in an electronic device without user consent as though the binary were a normal binary, personal information stored in the electronic device is leaked to the outside by the personal information releasing function included in the binary.

An insider attack may occur due to buggy code or malicious code, such as a personal information releasing function, included and issued in a normal binary by an insider having authority related to personal information. Accordingly, electronic devices require a method for preventing an insider attack caused by updating firmware from an unreliable source without the user being aware of the attack.

Various embodiments provide an apparatus and a method for updating firmware by using a security integrated circuit in an electronic device.

According to various embodiments, an electronic device may include: a security integrated circuit (IC) providing a rich execution environment and a secure execution environment, wherein the security integrated circuit includes a main processor operating in the rich execution environment and a secure processor operating in the secure execution environment, and wherein the secure processor is configured to: perform user authentication, based on firmware update information received from a server through the main processor; if the user authentication is successful, generate authentication information corresponding to the firmware update information; store the authentication information in at least a part of a secure memory; if the firmware is installed, perform authentication of the firmware, based on the authentication information stored in the secure memory; and if the authentication of the firmware is successful, install the firmware.

According to various embodiments, an operation method of an electronic device may include: in a security integrated circuit (IC) including a main processor operating in a rich execution environment and a secure processor operating in a secure execution environment, performing user authentication by the secure processor, based on firmware update information received from a server through the main processor; if the user authentication is successful, generating authentication information corresponding to the firmware update information; storing the authentication information in at least a part of a secure memory; if corresponding firmware is installed, performing authentication of the firmware, based on the authentication information stored in the secure memory; and if the authentication of the firmware is successful, installing the firmware.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure will be described in detail with reference to the accompanying drawings.

Figure 1:
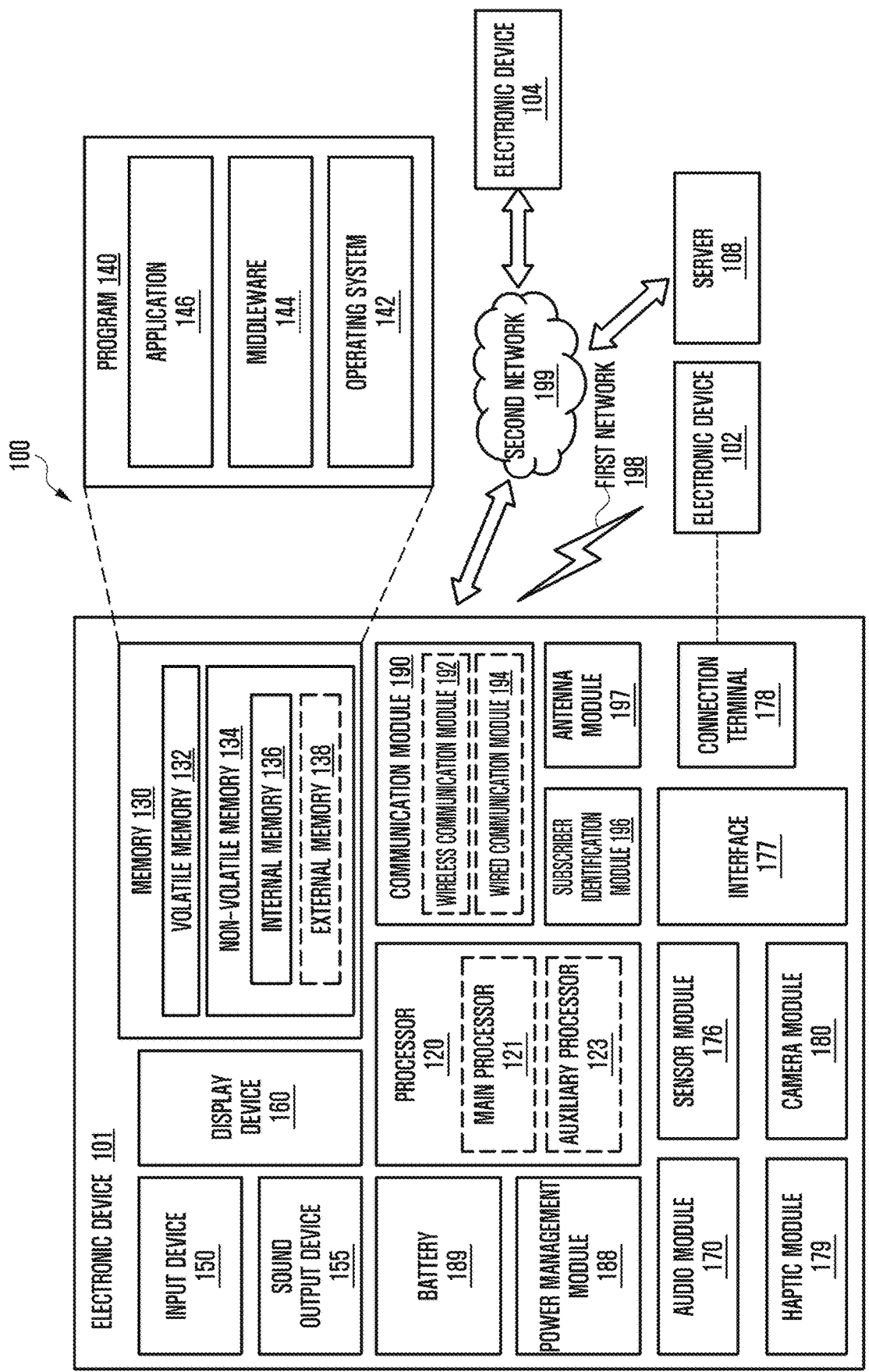
FIG. 1 illustrates a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and does not include a signal (e.g., an electromagnetic wave), but this term may not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
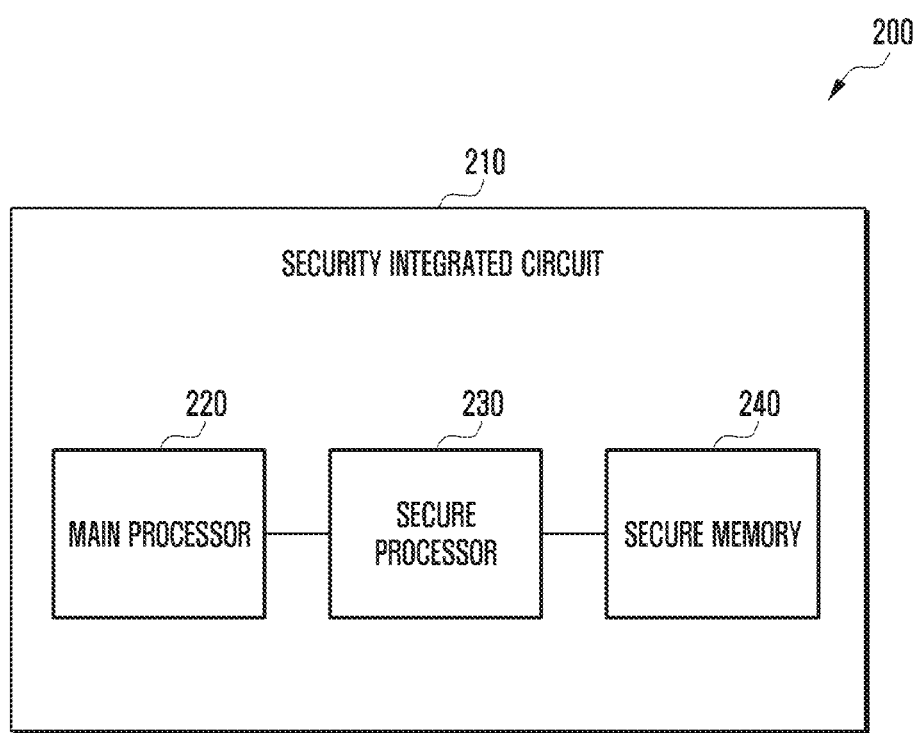
FIG. 2 illustrates a block diagram of an electronic device for updating firmware according to various embodiments.

FIG. 2 illustrates a block diagram of an electronic device 200 for updating firmware according to various embodiments. In the following description, the electronic device 200 may include at least a part of the electronic device 101 in FIG. 1.

Referring to FIG. 2, the electronic device 200 may include a security integrated circuit (IC) 210 supporting a general environment (rich execution environment or normal environment) and a secure environment (secure execution environment).

According to various embodiments, the security integrated circuit 210 may employ a system-on-chip (SoC) including a main processor 220, a secure processor 230, and a secure memory 240. According to an embodiment, the main processor 220 may be substantially identical to the main processor 121 in FIG. 1, or may be included therein. The secure processor 230 may be substantially identical to the auxiliary processor 123 in FIG. 1, or may be included therein. The secure memory 240 may be substantially identical to the non-volatile memory 134 in FIG. 1, or may be included therein.

According to various embodiments, the main processor 220 may control processing and calculation of data in a rich execution environment. According to an embodiment, if the use environment of the electronic device 200 satisfies a firmware update condition, the main processor 220 may transmit a request signal for updating firmware to the secure processor 230. For example, the firmware update condition may include at least one of "install now", "install at night", "install upon wireless LAN access", or "install at a particular time". The firmware update condition may be configured by a user. For example, the main processor 220 may include an application processor (AP).

According to various embodiments, the secure processor 230 may be operatively connected to the main processor 220 to communicate with the main processor 220. The secure processor 230 may receive a request for operating or initializing a secure execution environment from the main processor 220, and control processing and calculation of data in the secure execution environment. For example, the secure processor 230 may include at least one of a processing module, an encryption module, a secure memory controller, a secure cache, read only memory (ROM), random access memory (RAM), a memory controller (MEM controller), or a security sensor.

According to an embodiment, if the secure processor 230 determines that update information related to firmware, received from the main processor 220, is valid, the secure processor may perform user authentication of the update information related to the firmware. If the secure processor 230 succeeds in user authentication of update information related to firmware, the secure processor may generate authentication information related to the firmware and may store the generated authentication information in the secure memory 240. For example, the update information related to firmware may include at least one of firmware version information, patch contents, hash information related to the firmware, or a signature of an external apparatus (e.g. a server). For example, the validity of update information related to the firmware may be determined based on a signature of an external apparatus, by which whether the update information has been forged or falsified and the source of the update information can be identified. For example, the authentication information related to firmware may include at least one of version information of the firmware, hash information, and a hash-based message authentication code (HMAC) value of the secure processor 230, or information related to approval of the authentication information. For example, the version information of the firmware may include identification information of a firmware binary and/or version information (e.g. rollback prevention version (RP) of the firmware binary. The version information of the firmware binary may be signed with a signature key of a manufacturer, and thus the integrity of the version information may be ensured. For example, the hash information may include a hash value of the firmware binary. For example, the information related to approval of authentication information may include approval time point information of the authentication information and/or approval expiration time point information of the authentication information. For example, an approval expiration time point of authentication information may be configured based on an approval time point of the authentication information, or may be randomly configured based on a user input.

According to an embodiment, if the secure processor 230 receives a request signal for updating firmware from the main processor 220, the secure processor may determine whether authentication information stored in the secure memory 240 is valid. For example, the validity of authentication information stored in the secure memory 240 may be determined based on at least one of approval time point information of the authentication information, approval expiration time point information, or an HMAC value of the authentication information, which are included in the authentication information.

According to an embodiment, if the secure processor 230 has determined that authentication information stored in the secure memory 240 is valid, the secure processor 230 may authenticate firmware requested to be updated by the main processor 220, based on the authentication information stored in the secure memory 240. If the secure processor 230 succeeds in authenticating firmware requested to be updated by the main processor 220, the secure processor may update the firmware of the electronic device 200. For example, if hash information of authentication information and hash information of firmware requested to be updated by the main processor 220 are identical to each other, the secure processor 230 may determine that authentication of the firmware is successful.

According to various embodiments, the secure memory 240 may be operatively connected to the secure processor 230. For example, the secure memory 240 may perform encrypted communication with the secure processor 230 by using a key (e.g. subscriber management key (SMK)) previously shared with the secure processor 230. According to an embodiment, the secure memory 240 may store authentication information related to firmware, received from the secure processor 230, and/or the firmware. For example, the firmware stored in the secure memory 240 may include firmware currently running in the electronic device 200. For example, when the firmware of the electronic device 200 is updated, the secure memory 240 may store the updated firmware of the electronic device 200 by a control of the secure processor 230.

Figure 3:
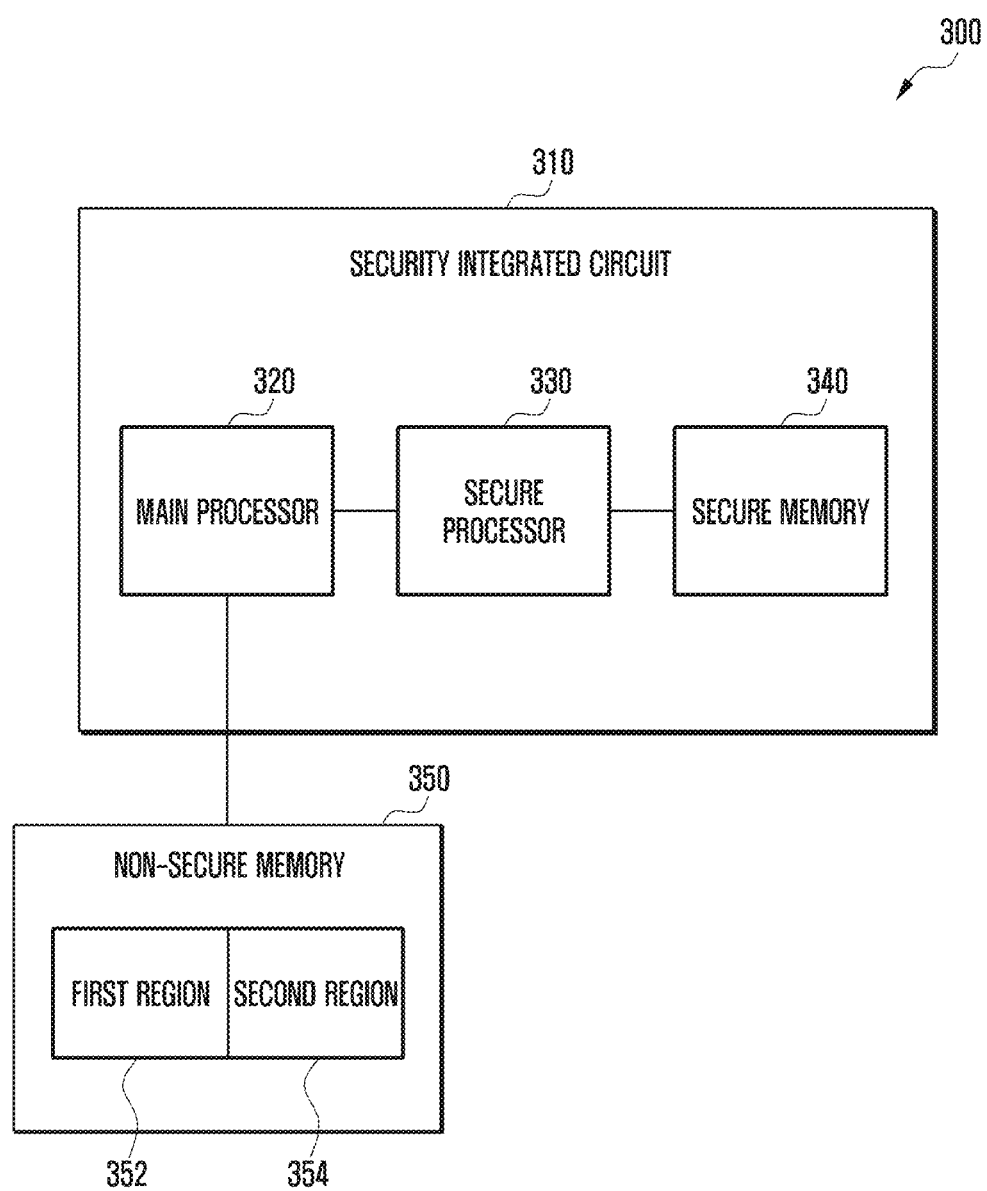
FIG. 3 illustrates a block diagram of an electronic device for updating firmware according to various embodiments.

FIG. 3 illustrates a block diagram of an electronic device 300 for updating firmware according to various embodiments. In the following description, the electronic device 300 may include at least a part of the electronic device 101 in FIG. 1.

Referring to FIG. 3, the electronic device 300 may include a security integrated circuit 310 and a non-secure memory 350. According to an embodiment, the non-secure memory 350 may be substantially identical to the non-volatile memory 134 in FIG. 1, or may be included therein.

According to various embodiments, the security integrated circuit 310 may employ a system-on-chip including a main processor 320 operating in a rich execution environment, a secure processor 330 operating in a secure execution environment, and a secure memory 340. The security integrated circuit 310 of the electronic device 300 may operate in a manner similar to the security integrated circuit 210 of the electronic device 200 in FIG. 2. For example, a main processor 320, a secure processor 330, and a secure memory 340 in FIG. 3 may operate in a manner similar to the main processor 220, the secure processor 230, and the secure memory 240 in FIG. 2. Accordingly, in order to avoid a duplicate description of FIG. 2, a detailed description of the elements of the security integrated circuit 310 of the electronic device 300 is omitted.

According to various embodiments, if the secure processor 330 has updated the firmware of the electronic device 300, the main processor 320 may store the updated firmware in the non-secure memory 350. According to an embodiment, if the secure processor 330 has updated the firmware of the electronic device 300, the main processor 320 may store firmware received from the secure processor 330 and signature information of the secure processor 330 in the non-secure memory 350. For example, the signature information of the secure processor 330 may include a security key (e.g. fused rights encryption key (REK), or fused bit) so as to secure communication of the secure processor 330.

According to various embodiments, the non-secure memory 350 may store various pieces of data used by at least one element (e.g. the main processor 320) of the electronic device 300 in a rich execution environment. According to an embodiment, the non-secure memory 350 may include a first region 352 and a second region 354 for storing firmware. For example, the first region 352 may be designated to be a non-active region in which new firmware downloaded from an external apparatus to update firmware is stored. The second region 354 may be designated to be an active region in which firmware currently running in the electronic device 300 is stored. According to an embodiment, if the secure processor 330 has updated the firmware of the electronic device 300, based on firmware stored in the first region 352, the first region 352 of the non-secure memory 350 may be changed to an active region by a control of the main processor 320. That is, firmware stored in the first region 352 may be configured to be firmware currently running in the electronic device 300 through firmware updating. Signature information of the secure processor 330 may be stored together with the firmware of the electronic device 300 in the first region 352. According to an embodiment, if the secure processor 330 has updated the firmware of the electronic device 300, the second region 354 of the non-secure memory 350 may be changed to a non-active region by a control of the main processor 320. Signature information related to previously stored firmware may be removed from the second region 354.

Figure 4:
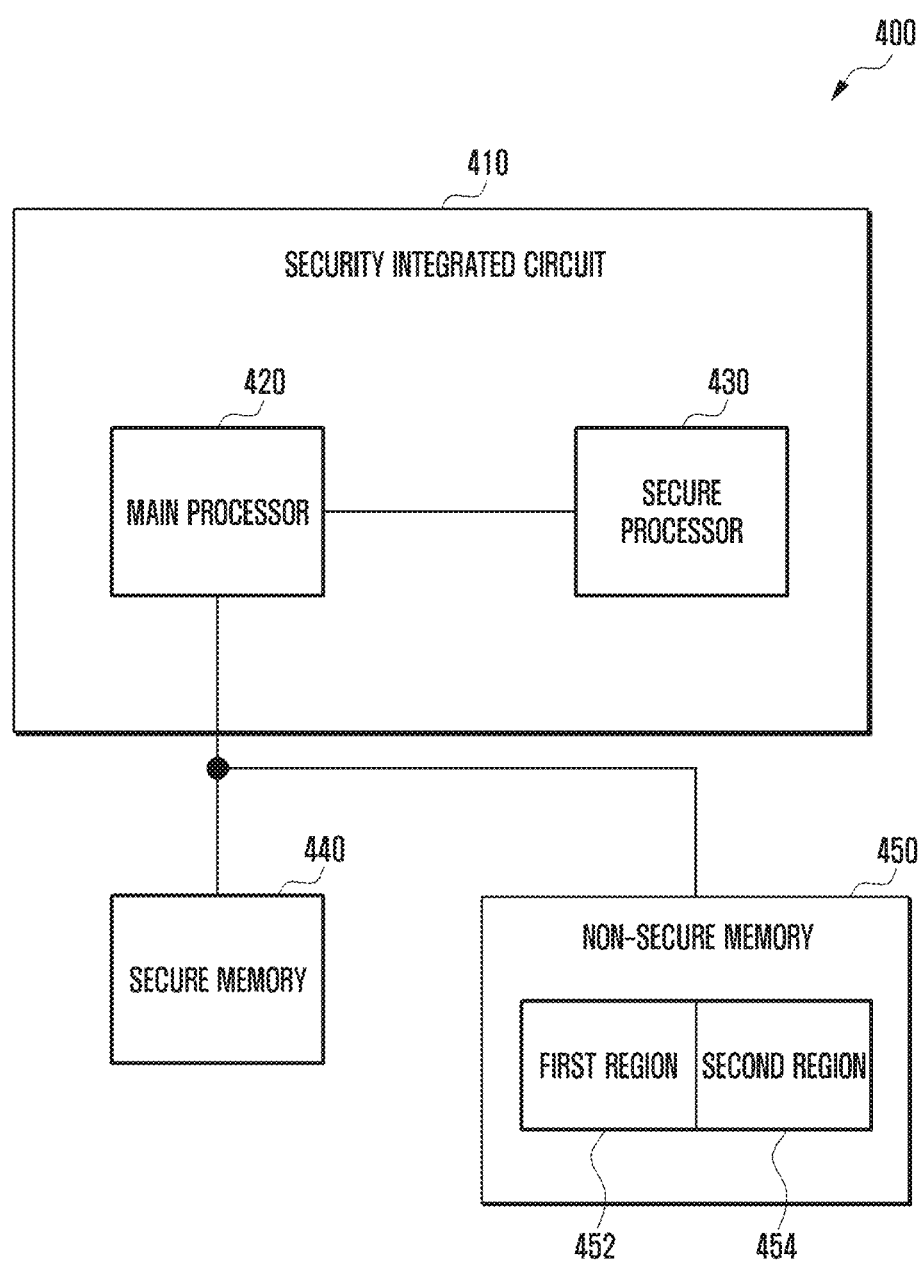
FIG. 4 illustrates a block diagram of an electronic device for updating firmware according to various embodiments.

FIG. 4 illustrates a block diagram of an electronic device 400 for updating firmware according to various embodiments. In the following description, the electronic device 400 may include at least a part of the electronic device 101 in FIG. 1.

Referring to FIG. 4, the electronic device 400 may include a security integrated circuit 410, a secure memory 440, and a non-secure memory 450.

According to various embodiments, the security integrated circuit 410 may employ a system-on-chip including a main processor 420 operating in a rich execution environment and a secure processor 430 operating in a secure execution environment. The security integrated circuit 410 of the electronic device 400 may operate in a manner similar to the security integrated circuit 210 of the electronic device 200 in FIG. 2, differing in that the secure memory 440 is separate from the security integrated circuit 410. For example, the main processor 420 and the secure processor 430 in FIG. 4 may operate in a manner similar to the main processor 220 and the secure processor 230 in FIG. 2. Accordingly, in order to avoid a duplicate description of FIG. 2, a detailed description of the elements of the security integrated circuit 410 of the electronic device 400 is omitted.

According to various embodiments, the secure processor 430 may encrypt data transmitted to the secure memory 440 in order to prevent the data from being exposed to the outside due to the secure memory 440 existing outside the security integrated circuit 410. According to an embodiment, if the secure processor 430 succeeds in user authentication of update information related to firmware, the secure processor may generate an authentication key (AK) and an encryption key (EK). The authentication key may be used for generating an HMAC value included in authentication information. The encryption key may be used for encrypting information included in authentication information. For example, the authentication key may be generated through a key derivation function (KDF) to which a key (e.g. SMK) previously shared between the secure processor 430 and the secure memory 440 and a security key (e.g. fused REK, or fused bit) defined for securing communication of the secure processor 430 are applied. For example, the encryption key may be generated through a KDF, to which a security key is applied, to secure communication of the secure processor 430. According to an embodiment, the main processor 420 may store data (e.g. authentication information) encrypted by the secure processor 430 in the secure memory 440.

According to various embodiments, the non-secure memory 450 may store various pieces of data used by at least one element (e.g. the main processor 420) of the electronic device 400 in a rich execution environment. According to an embodiment, the non-secure memory 450 may include a first region 452 (e.g. the first region 352 in FIG. 3) and a second region 454 (e.g. the second region 354 in FIG. 3) for storing firmware.

Figure 5:
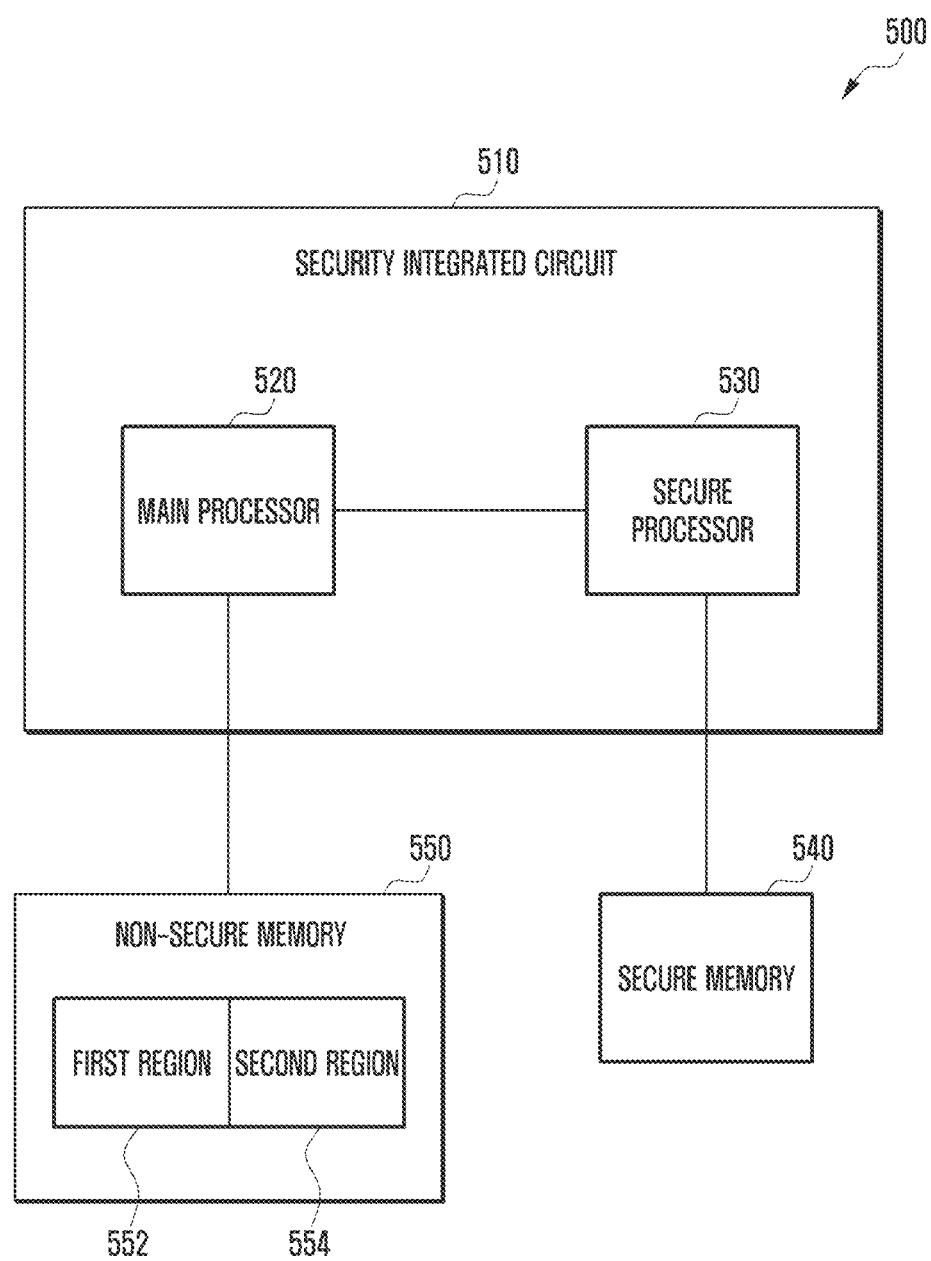
FIG. 5 illustrates a block diagram of an electronic device for updating firmware according to various embodiments.

FIG. 5 illustrates a block diagram of an electronic device 500 for updating firmware according to various embodiments. In the following description, the electronic device 500 may include at least a part of the electronic device 101 in FIG. 1.

Referring to FIG. 5, the electronic device 500 may include a security integrated circuit 510, a secure memory 540, and a non-secure memory 550.

According to various embodiments, the security integrated circuit 510 may employ a system-on-chip including a main processor 520 operating in a rich execution environment and a secure processor 530 operating in a secure execution environment. The security integrated circuit 510 of the electronic device 500 may operate in a manner similar to the security integrated circuit 210 of the electronic device 200 in FIG. 2, differing in that the secure memory 540 is separate from the security integrated circuit 510. For example, the main processor 520 and the secure processor 530 in FIG. 5 may operate in a manner similar to the main processor 220 and the secure processor 230 in FIG. 2. Accordingly, in order to avoid a duplicate description of FIG. 2, a detailed description of the elements of the security integrated circuit 510 of the electronic device 500 is omitted.

According to various embodiments, the secure processor 530 may encrypt data transmitted to the secure memory 540 in order to prevent the data from being exposed to the outside due to the secure memory 540 existing outside the security integrated circuit 510. According to an embodiment, the secure processor 530 may encrypt security information, based on a key (e.g. SMK) previously shared with the secure memory 540. The secure processor 530 may store security information encrypted based on a previously shared key in the secure memory 540.

According to various embodiments, the non-secure memory 550 may store various pieces of data used by at least one element (e.g. the main processor 520) of the electronic device 400 in a rich execution environment. According to an embodiment, the non-secure memory 550 may include a first region 552 (e.g. the first region 352 in FIG. 3) and a second region 554 (e.g. the second region 354 in FIG. 3) for storing firmware.

According to various embodiments, an electronic device (e.g. the electronic device 200 in FIG. 2) may include a security integrated circuit (IC) providing a rich execution environment and a secure execution environment, wherein the security integrated circuit (e.g. the security integrated circuit 210 in FIG. 2) includes a main processor (e.g. the main processor 220 in FIG. 2) operating in the rich execution environment, and a secure processor (e.g. the secure processor 230 in FIG. 2) operating in the secure execution environment, and wherein the secure processor is configured to: perform user authentication, based on firmware update information received from a server through the main processor; if the user authentication is successful, generate authentication information corresponding to the firmware update information; store the authentication information in at least a part of a secure memory (e.g. the secure memory 240 in FIG. 2); if the firmware is installed, perform authentication of the firmware, based on the authentication information stored in the secure memory; and if the authentication of the firmware is successful, install the firmware.

According to various embodiments, the secure memory may be included in the security integrated circuit.

According to various embodiments, the authentication information may include at least one of version information included in the firmware update information, a hash included in the firmware update information, a hash-based message authentication code (HMAC) related to the secure processor, a time related to approval of the authentication information, or an approval expiration time of the authentication information.

According to various embodiments, the secure processor may: determine whether signature information of the server, included in the firmware update information, satisfies a designated condition; and if the signature information of the server satisfies the designated condition, perform user authentication of the firmware update information.

According to various embodiments, the secure processor may: determine whether signature information of the server, included in the firmware update information, satisfies a designated condition; if the signature information of the server satisfies the designated condition, compare version information included in the firmware update information with version information of firmware installed in the electronic device; and if a version included in the firmware update information is later than a version of the firmware installed in the electronic device, perform user authentication of the firmware update information.

According to various embodiments, if the secure memory is located outside the security integrated circuit, the secure processor may encrypt the authentication information with a security key related to the secure processor and store the encrypted authentication information in at least a part of the secure memory.

According to various embodiments, if an installation condition for the firmware is satisfied, the main processor may transmit a request signal for installing the firmware to the secure processor, and if the secure processor receives the request signal from the main processor, the secure processor may perform authentication of the firmware, based on the authentication information stored in the secure memory.

According to various embodiments, the secure processor may: determine whether the authentication information stored in the secure memory is valid; and if the authentication information is determined to be valid, perform authentication of the firmware, based on the authentication information.

According to various embodiments, the secure processor may determine whether the authentication information stored in the secure memory is valid, based on at least one of an HMAC value, a validity time interval, or a number of times of use of the authentication information.

According to various embodiments, the secure processor may: if the authentication of the firmware fails, perform user authentication of the firmware; and if the user authentication is successful, install the firmware.

Figure 6:
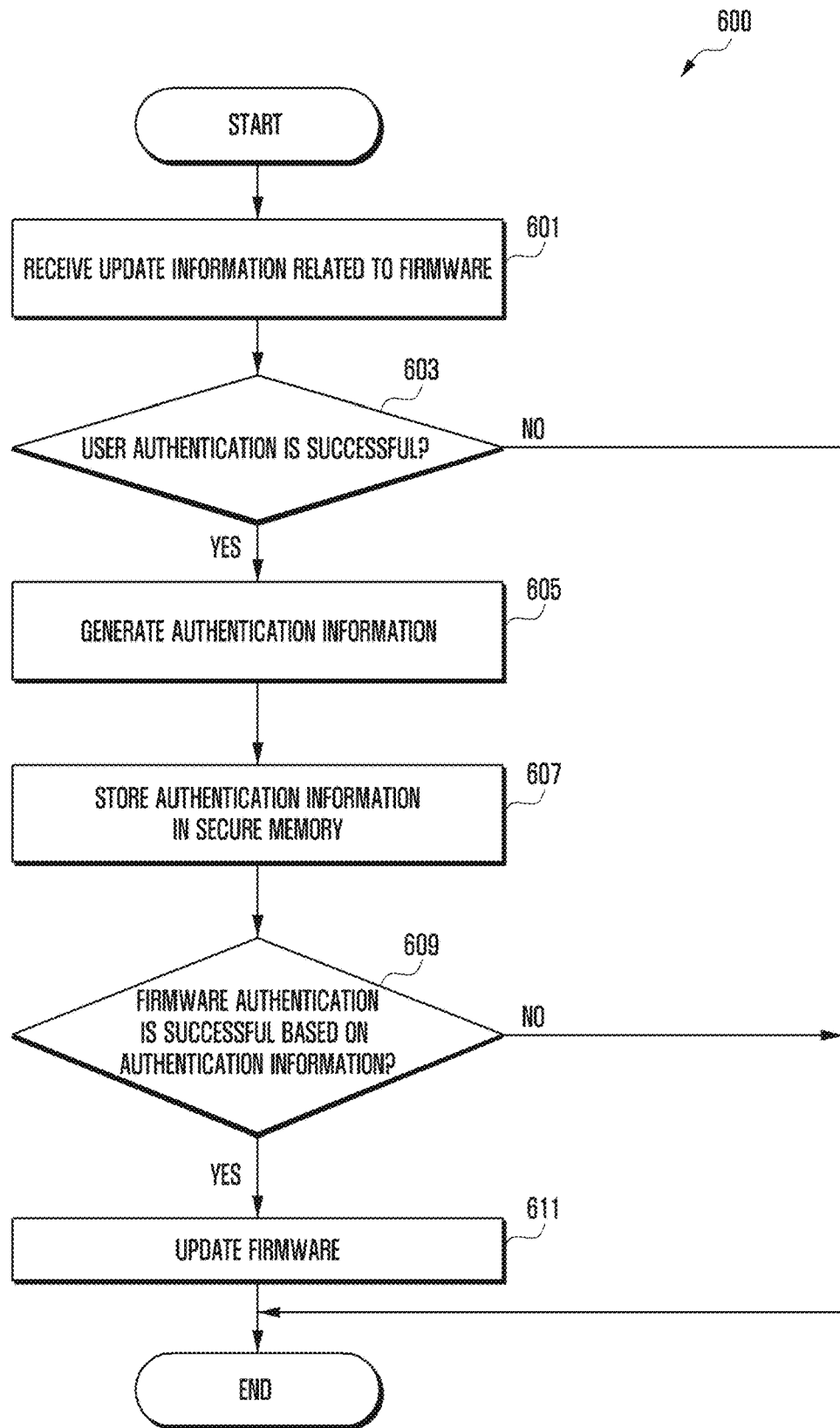
FIG. 6 illustrates a flowchart for updating firmware in an electronic device according to various embodiments.

FIG. 6 illustrates a flowchart 600 for updating firmware in an electronic device according to various embodiments. In the embodiment below, operations may be sequentially performed, but the disclosure is not limited to the sequential operations. For example, the sequences of operations may be changed, and at least two operations may be performed in parallel. The electronic device in FIG. 6 may be the electronic device 101 in FIG. 1, or the electronic device 200 in FIG. 2.

Referring to FIG. 6, according to various embodiments, the electronic device (e.g. the processor 120 in FIG. 1 or the secure processor 230 in FIG. 2) may receive update information related to firmware in operation 601. According to an embodiment, the secure processor 230 may receive update information related to firmware from an external apparatus (e.g. a server) through the main processor 220. For example, the secure processor 230 may receive the update information related to the firmware from a trusted external apparatus through a transport layer security (TLS) protocol. For example, the update information related to the firmware may include at least one of firmware version information, patch contents, hash information related to the firmware, or a signature of an external apparatus (e.g. a server).

According to various embodiments, the electronic device (e.g. the processor 120 or the secure processor 230) may identify whether user authentication of the update information related to the firmware is successful, in operation 603. According to an embodiment, the secure processor 230 may output patch contents of update information related to firmware, received from a trusted external apparatus, through a display device (e.g. the display device 160 in FIG. 1) so as to allow a user to identify the patch contents. The secure processor 230 may determine whether user authentication is successful, based on a user input related to the patch contents displayed on the display device. For example, the trusted external apparatus may be identified based on signature information of the external apparatus included in the update information related to the firmware. For example, the firmware version information may include identification information of the firmware binary and firmware binary version information.

According to various embodiments, if the electronic device (e.g. the processor 120 or the secure processor 230) succeeds in user authentication of the update information of the firmware (e.g. "YES" relating to operation 603), the electronic device may generate authentication information related to the firmware in operation 605. According to an embodiment, the secure processor 230 may generate authentication information related to the firmware, based on at least a part (e.g. firmware version information and firmware hash information) of the update information related to the firmware. For example, the authentication information related to the firmware may further include an HMAC value of the secure processor 230 to indicate that the authentication information has been generated by the secure processor 230, or to identify the integrity of the authentication information. For example, the authentication information related to the firmware may further include at least one of approval time point information of the authentication information or approval expiration time point information. As another example, if the secure memory 440 is located outside the security integrated circuit 410 as illustrated in FIG. 4, the secure processor 430 may generate an authentication key (AK) and an encryption key (EK), based on a security key (e.g. fused REK, or fused bit) defined for securing communication of the secure processor 430. The secure processor 430 may generate an HMAC value to be included in authentication information, based on the authentication key, and encrypt information (e.g. an HMAC value, firmware version information, firmware hash information, and information related to approval of authentication information) to be included in the authentication information by using the security key, so as to generate the authentication information.

According to various embodiments, the electronic device (e.g. the processor 120 or the secure processor 230) may store the authentication information related to the firmware in a secure memory in operation 607. According to an embodiment, the secure processor 230 may securely store the authentication information related to the firmware in the secure memory 240 through a secure channel generated based on a key (e.g. SMK) previously shared with the secure memory 240. According to another embodiment, the secure processor 430 may store the authentication information related to the firmware in the secure memory 440 located outside the security integrated circuit 410 through the main processor 420. For example, if there is previously stored authentication information in the secure memory 240, the secure processor 230 may replace the previously stored authentication information stored in the secure memory 240 with the new authentication information.

According to various embodiments, the electronic device (e.g. the processor 120 or the secure processor 230) may identify whether authentication of the firmware is successful, based on the authentication information stored in the secure memory, in operation 609. According to an embodiment, if a firmware updating time point has arrived, the main processor 220 may transmit a request signal for updating firmware to the secure processor 230. If the secure processor 230 receives a request signal for updating firmware from the main processor 220, the secure processor may generate a hash value corresponding to the firmware received from the main processor 220. If the hash value corresponding to the firmware received from the main processor 220 and a hash value included in the authentication information stored in the secure memory are identical to each other, the secure processor 230 may determine that the authentication of the firmware is successful. Additionally, if the version information of the firmware received from the main processor 220 and the version information included in the authentication information stored in the secure memory are identical to each other, the secure processor 230 may determine that the authentication of the firmware is successful. According to an embodiment, if it is determined that the authentication information stored in the secure memory 240 is valid, the secure processor 230 may perform authentication of the firmware, based on the authentication information stored in the secure memory 240.

According to various embodiments, if the electronic device (e.g. the processor 120 or the secure processor 230) succeeds in authenticating the firmware, based on the authentication information stored in the secure memory (e.g. "YES" relating to operation 609), the electronic device may update the firmware of the electronic device with the firmware, the authentication of which was successful, in operation 611. According to an embodiment, if the storage space (or capacity) of the secure memory 240 is sufficiently large to hold the firmware, the secure processor 230 may store the updated firmware in the secure memory 240. According to another embodiment, the secure processor 330 may store the updated firmware in the non-secure memory 450. The non-secure memory 450 may store a signature of the secure processor 330 together with the updated firmware.

According to various embodiments, if the electronic device (e.g. the processor 120 or the secure processor 230) fails in user authentication of the update information related to the firmware (e.g. "NO" relating to operation 603), or fails in authentication of the firmware, based on the authentication information stored in the secure memory (e.g. "NO" relating to operation 609), a firmware update procedure based on the authentication information may be blocked. According to an embodiment, if the secure processor 230 fails in user authentication of the update information related to the firmware, or fails in authentication of the firmware, based on the authentication information, the secure processor may again perform user authentication. According to another embodiment, if the secure processor 230 fails in user authentication of the update information related to the firmware, or fails in authentication of the firmware, based on the authentication information, the secure processor may output firmware update restriction information.

Figure 7:
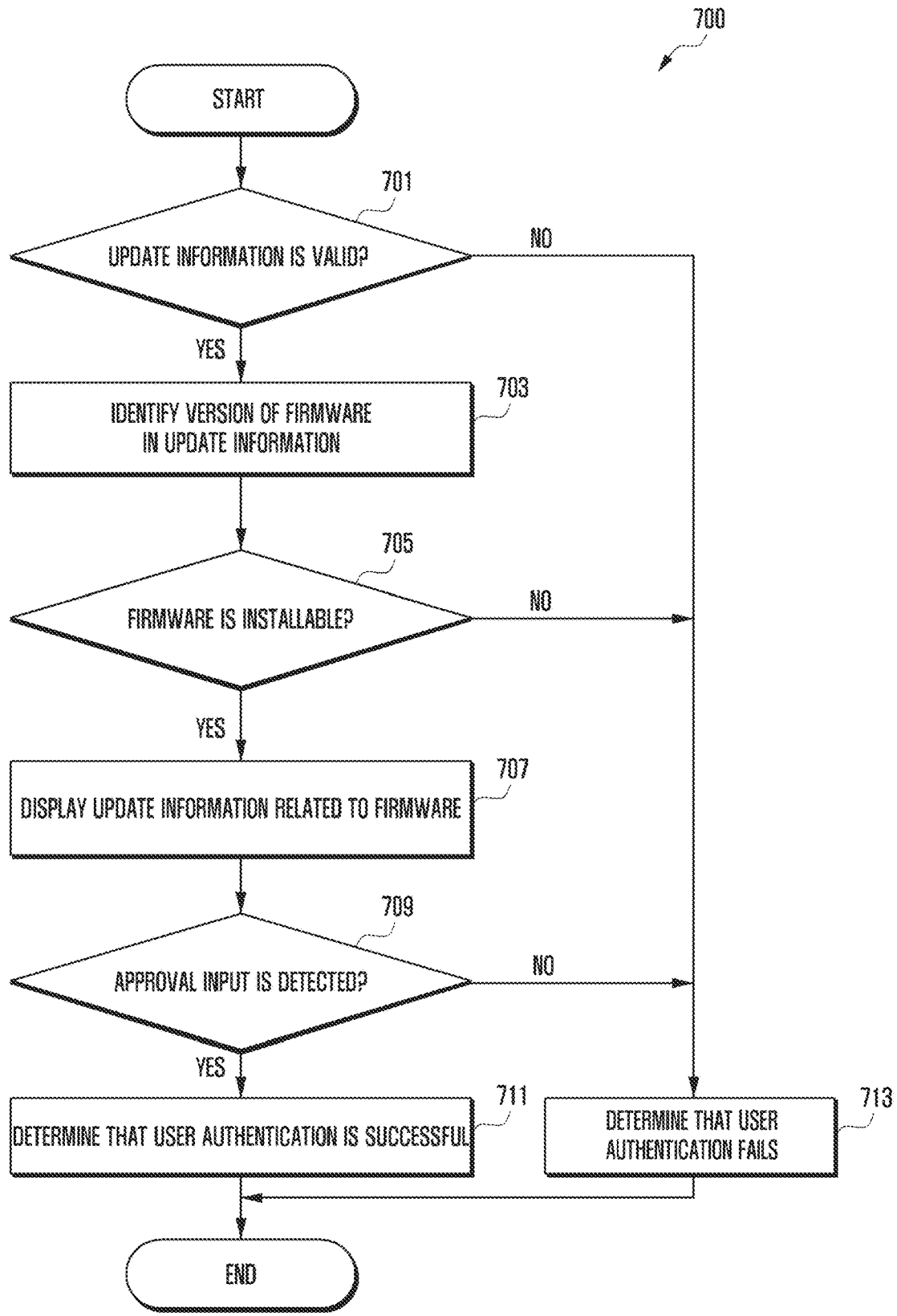
FIG. 7 illustrates a flowchart for performing user authentication of update information in an electronic device according to various embodiments.
Figure 8A:
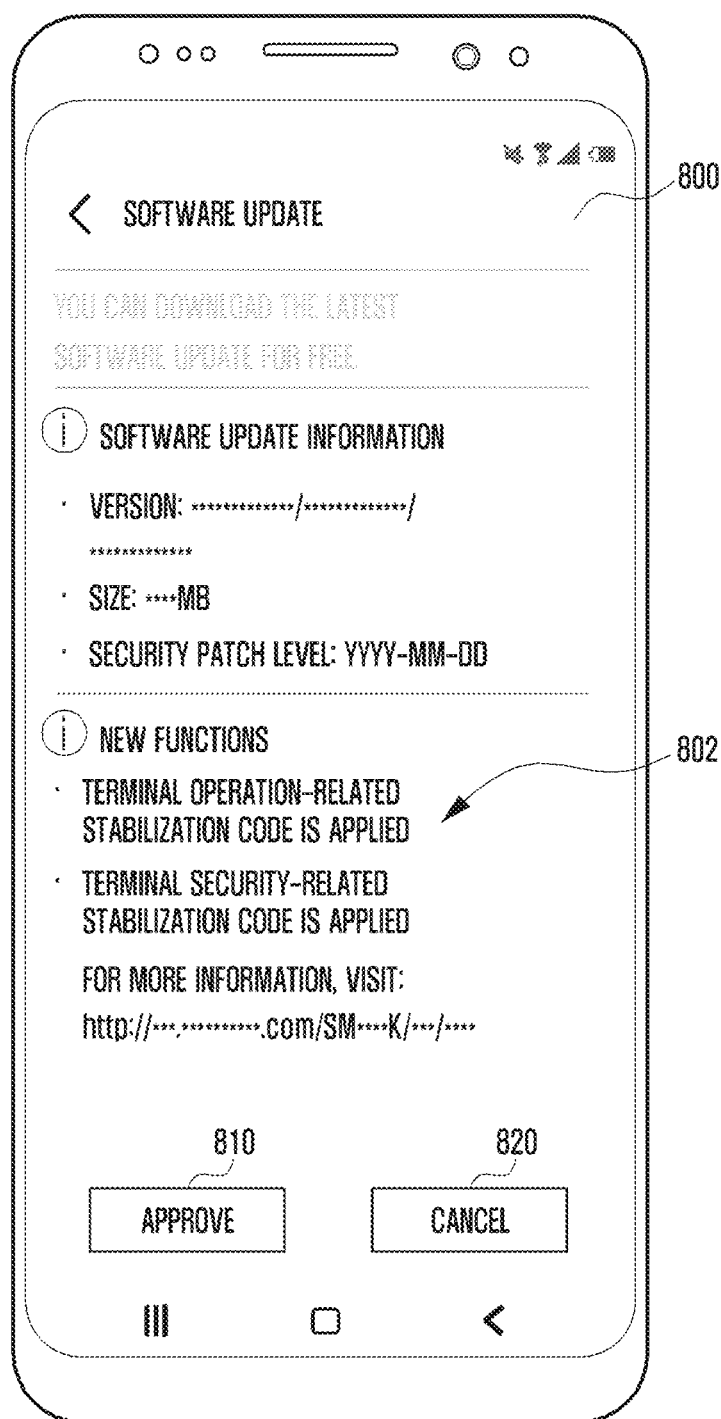
FIG. 8A illustrates a screen configuration for user authentication according to various embodiments.
Figure 8B:
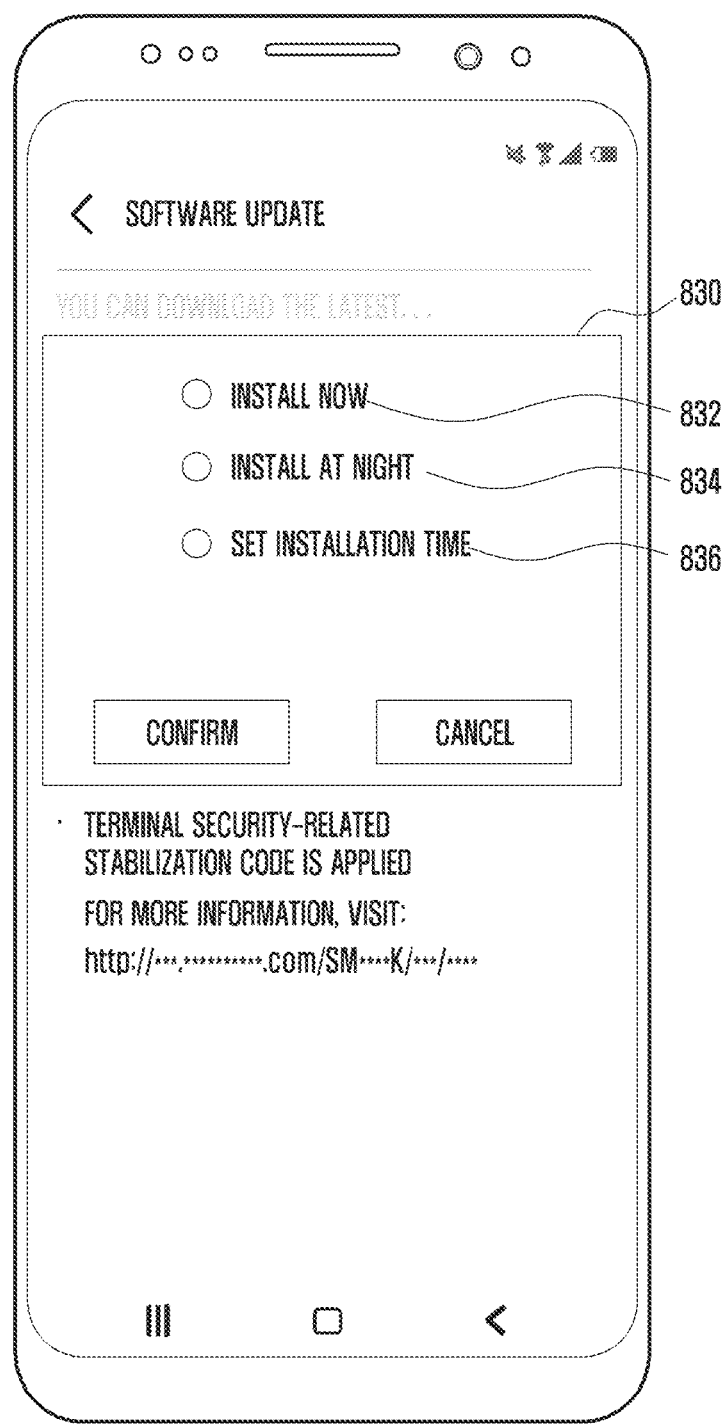
FIG. 8B illustrates a screen configuration for configuring a firmware update condition according to various embodiments.

FIG. 7 illustrates a flowchart 700 for performing user authentication of update information in an electronic device according to various embodiments. The operations in FIG. 7 described below may be detailed sub-operations of operation 603 in FIG. 6. In the embodiment below, operations may be sequentially performed, but the disclosure is not limited to the sequential operations. For example, the sequences of the operations may be changed, and at least two operations may be performed in parallel. The electronic device in FIG. 7 may be the electronic device 101 in FIG. 1, or the electronic device 200 in FIG. 2. Hereinafter, at least a part of the operations in FIG. 7 may be described with reference to FIGS. 8A and 8B. FIG. 8A illustrates a screen configuration for user authentication according to various embodiments. FIG. 8B illustrates a screen configuration for configuring a firmware update condition according to various embodiments.

Referring to FIG. 7, according to various embodiments, if the electronic device (e.g. the processor 120 in FIG. 1 or the secure processor 230 in FIG. 2) receives update information related to firmware (e.g. operation 601 in FIG. 6), the electronic device may determine whether the update information related to the firmware is valid, in operation 701. According to an embodiment, if the secure processor 230 receives update information related to firmware from an external apparatus (e.g. a server) through the main processor 220, the secure processor may determine whether the external apparatus is trustworthy, based on signature information of the external apparatus included in the update information. For example, if the signature information of the external apparatus included in the update information is included in an authenticated apparatus list stored in a memory (e.g. the memory 130 or the secure memory 240), the secure processor 230 may determine that the external apparatus is trustworthy. If the secure processor 230 has determined that the external apparatus is trustworthy, the secure processor may determine that the update information related to the firmware is valid.

According to various embodiments, if the electronic device (e.g. the processor 120 or the secure processor 230) determines that the update information related to the firmware is valid (e.g. "YES" relating to operation 701), the electronic device may identify version information of the firmware, included in the update information, in operation 703. For example, the version information of the firmware may include identification information of the firmware binary and firmware binary version information.

According to various embodiments, the electronic device (e.g. the processor 120 or the secure processor 230) may determine whether the firmware is capable of being installed in the electronic device, based on the version information of the firmware, included in the update information, in operation 705. According to an embodiment, the secure processor 230 may compare the version information of firmware that is operating in the electronic device 200, with the version information of the firmware, included in the update information. If the version of the firmware that is operating in the electronic device 200 is earlier (or lower) than the version of the firmware included in the update information, the secure processor 230 may determine that the firmware related to the update information is capable of being installed in the electronic device. Accordingly, the secure processor 230 can prevent the firmware from being updated to a prior version (or a lower version). For example, the version information of firmware that is operating in the electronic device 200 may be identified in authentication information stored in the secure memory 240.

According to various embodiments, if the electronic device (e.g. the processor 120 or the secure processor 230) has determined that the firmware related to the update information is installable in the electronic device (e.g. "YES" relating to operation 705), the electronic device may display the update information related to the firmware, in operation 707. According to an embodiment, the secure processor 230 may control a display device (e.g. the display device 160 in FIG. 1) through the main processor 220 such that the display device displays patch information included in the update information. For example, the display device (e.g. the display device 160 in FIG. 1) may display patch information 800 included in the update information, as illustrated in FIG. 8A. The patch information 800 may include information 802 relating to functions that have been modified, added, or removed through the firmware update.

According to various embodiments, the electronic device (e.g. the processor 120 or the secure processor 230) may identify whether an approval input corresponding to the update information related to the firmware is detected, in operation 709. According to an embodiment, the secure processor 230 may identify whether an input corresponding to an approval button 810 is detected in the patch information 800 displayed in at least a part of the display device, as illustrated in FIG. 8A. For example, if the secure processor 230 detects an input corresponding to the approval button 810 within a reference time interval, the secure processor may determine that the secure processor has detected an approval input corresponding to the update information related to the firmware. For example, if an input corresponding to the approval button is not detected during a reference time interval, or an input corresponding to a cancel button 820 is detected, the secure processor 230 may determine that an approval input corresponding to the update information related to the firmware is not detected.

According to various embodiments, if an approval input corresponding to the update information related to the firmware is detected (e.g. "YES" relating to operation 709), the electronic device (e.g. the processor 120 or the secure processor 230) may determine that user authentication of the update information related to the firmware is successful, in operation 711. According to an embodiment, if the secure processor 230 succeeds in user authentication of the update information related to the firmware, the secure processor may provide a firmware installation time point (or an installation condition) configured based on a user input to the main processor 220. For example, if the secure processor 230 detects an input corresponding to the approval button 810 of the patch information 800 displayed in the display device, the secure processor may control the display device (e.g. the display device 160 in FIG. 1) to display a menu 830 for configuring a firmware installation time point, as illustrated in FIG. 8B. The secure processor 230 may control the display device by using the main processor 220. For example, the menu 830 for configuring a firmware installation time point may include "install now" 832, "install at night" 834, and "set installation time" 836. The secure processor 230 may configure a firmware installation time point, based on a selection input made by a user to the menu 830 for configuring a firmware installation time point.

According to various embodiments, if the update information related to the firmware is determined not to be valid (e.g. "NO" relating to operation 701), the firmware related to the update information is determined to be incapable of being installed in the electronic device (e.g. "NO" relating to operation 705), or if an approval input corresponding to the update information related to the firmware is not detected (e.g. "NO" relating to operation 709), the electronic device (e.g. the processor 120 or the secure processor 230) may determine that user authentication of the update information related to the firmware failed, in operation 713. According to an embodiment, if the secure processor 230 fails in user authentication of the update information related to the firmware, the secure processor may provide authentication failure information to the main processor 220. The main processor 220 may control the display device (e.g. the display device 160 in FIG. 1) to output the authentication failure information received from the secure processor 230.

Figure 9:
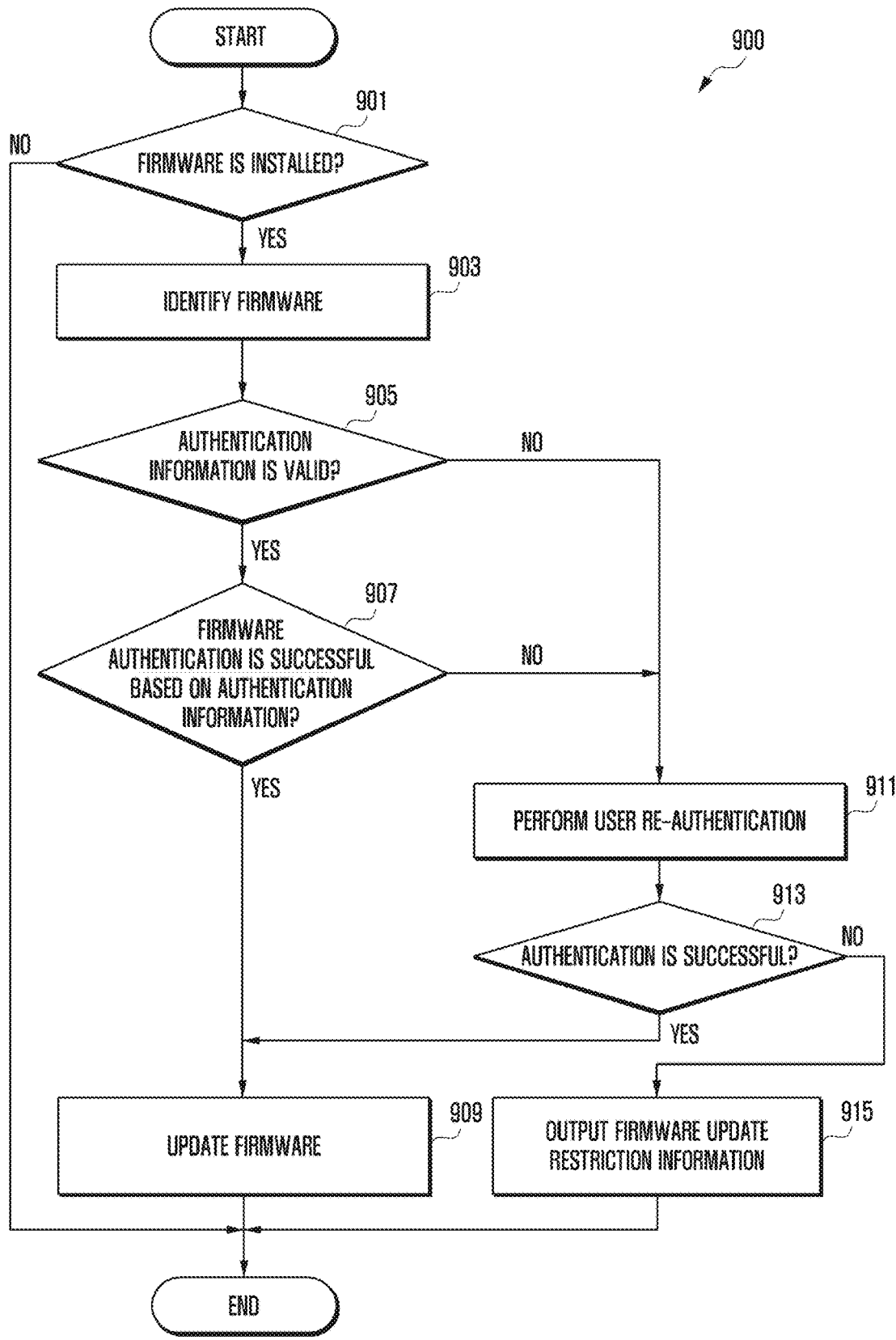
FIG. 9 illustrates a flowchart for updating firmware, based on authentication information, in an electronic device according to various embodiments.
Figure 10A:
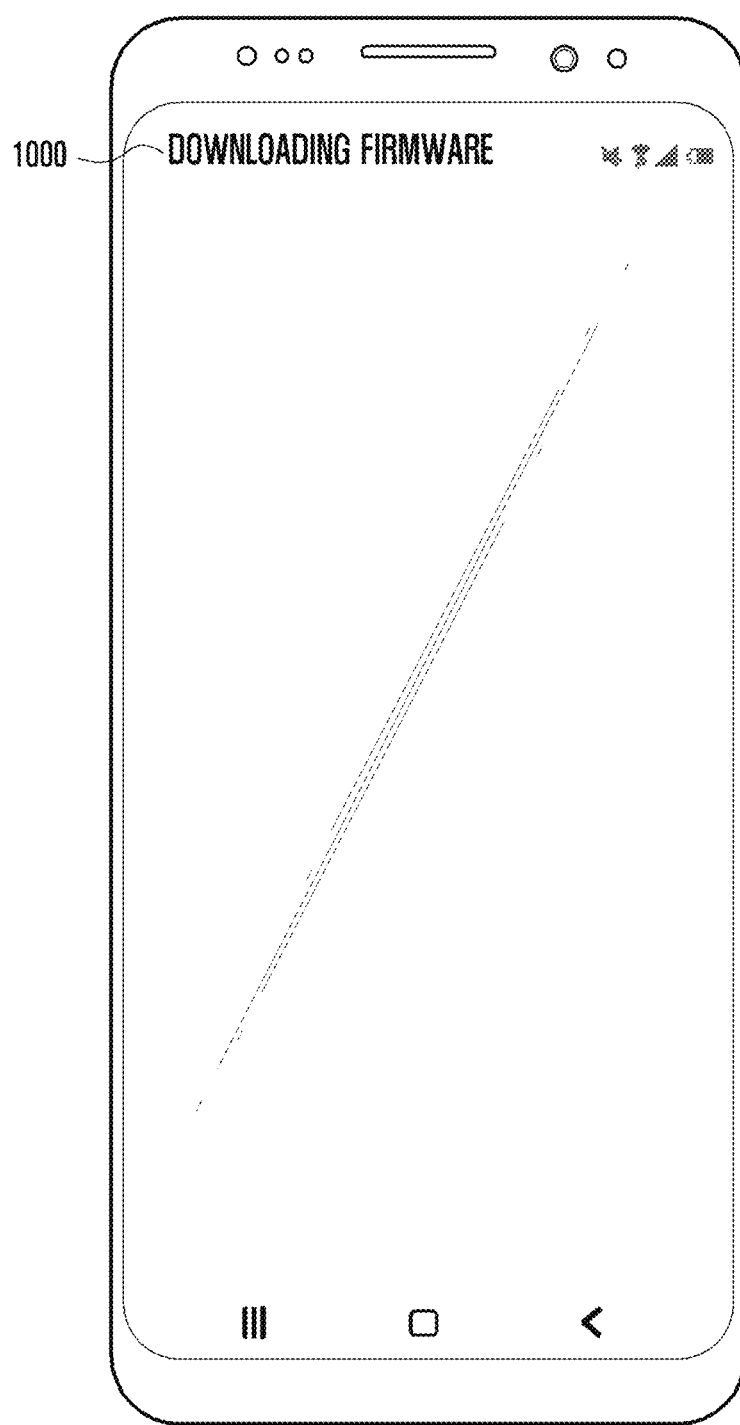
FIG. 10A illustrates a screen configuration including firmware download state information according to various embodiments.
Figure 10B:
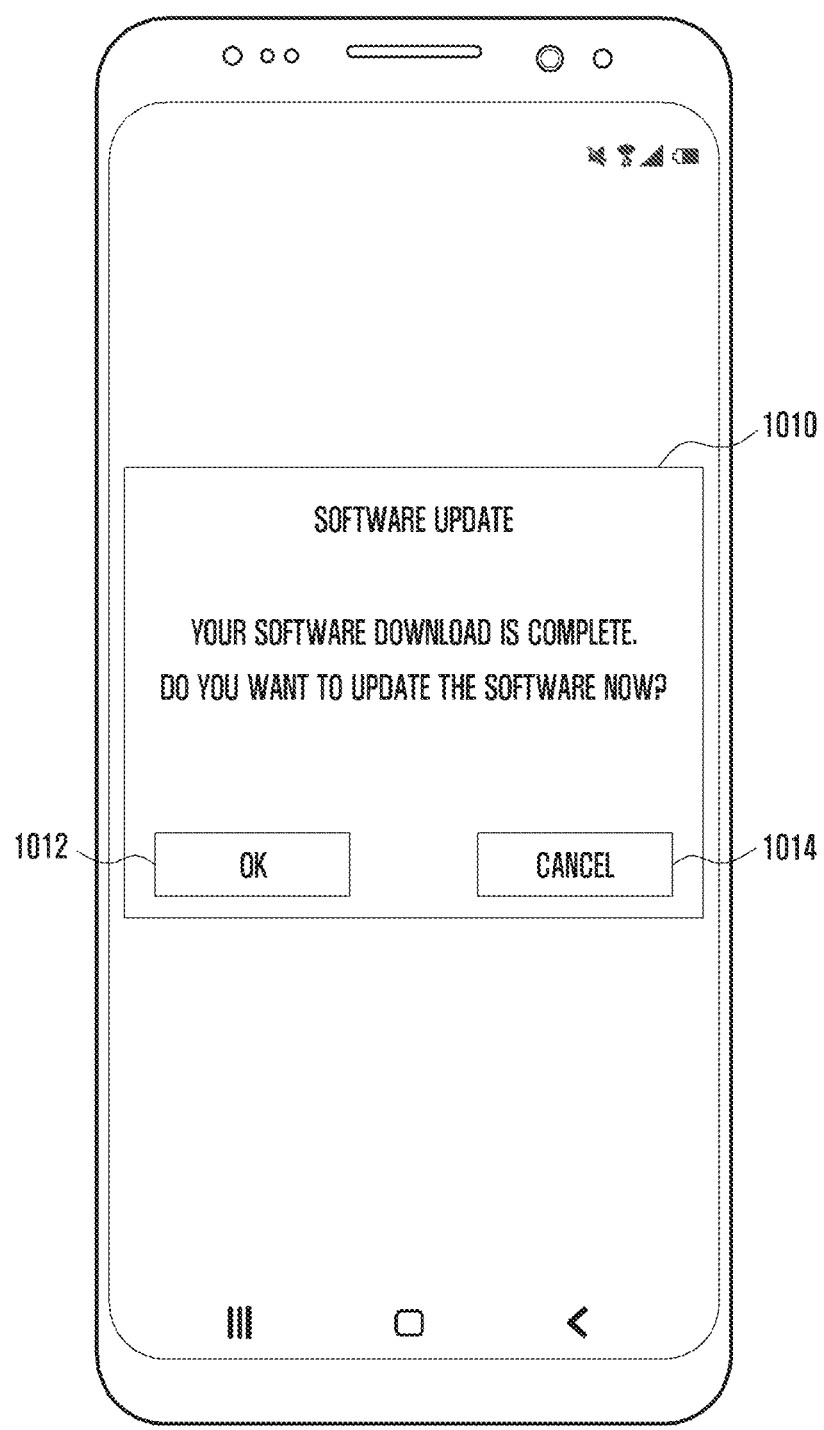
FIG. 10B illustrates a screen configuration for determining whether to install firmware according to various embodiments.
Figure 10C:
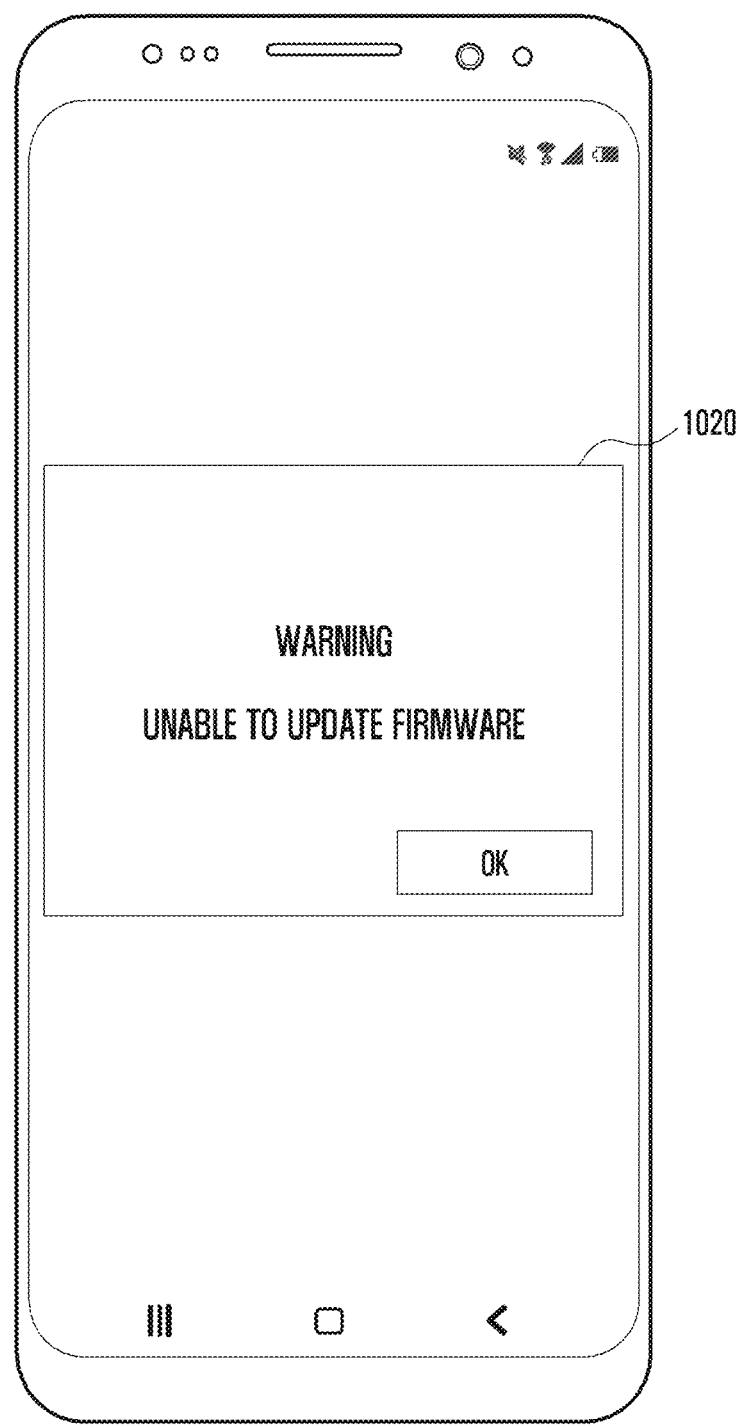
FIG. 10C illustrates a screen configuration including firmware update restriction information according to various embodiments.

FIG. 9 illustrates a flowchart 900 for updating firmware, based on authentication information, in an electronic device according to various embodiments. The operations in FIG. 9 described below may be detailed sub-operations of operations 609 to 611 in FIG. 6. In the embodiment below, operations may be sequentially performed, but the disclosure is not limited to the sequential operations. For example, the sequences of the operations may be changed, and at least two operations may be performed in parallel. The electronic device in FIG. 7 may be the electronic device 101 in FIG. 1 or the electronic device 200 in FIG. 2. Hereinafter, at least a part of the operations in FIG. 9 may be described with reference to FIGS. 10A, 10B, and 10C. FIG. 10A illustrates a screen configuration including firmware download state information according to various embodiments. FIG. 10B illustrates a screen configuration for determining whether to install firmware according to various embodiments. FIG. 10C illustrates a screen configuration including firmware update restriction information according to various embodiments.

Referring to FIG. 9, according to various embodiments, the electronic device (e.g. the processor 120 in FIG. 1 or the main processor 220 in FIG. 2) may identify whether the use environment of the electronic device satisfies a firmware installation condition, in operation 901. According to an embodiment, the main processor 220 may identify whether a firmware installation time point (e.g. "install at night", or "install at particular time point") configured by a user has arrived. According to another embodiment, if "install upon wireless LAN (e.g. WIFI) access" is configured as the firmware installation condition, the main processor 220 may download firmware when the electronic device 200 accesses a wireless LAN. When the downloading of the firmware is completed, the main processor 220 may determine that the firmware installation condition is satisfied. The main processor 220 may control at least one element (e.g. the sound output device 155, the display device 160, or an indicator) to output firmware downloading information to the outside, so as to allow a user to recognize the firmware download state. For example, the display device (e.g. the display device 160) may display download state information 1000 of firmware, for example, "Downloading firmware", as illustrated in FIG. 10A. According to another embodiment, if "install now" is configured, the main processor 220 may identify whether downloading of firmware is completed. If the downloading of the firmware is completed, the main processor 220 may determine that the firmware installation condition is satisfied.

According to various embodiments, if the electronic device (e.g. the processor 120 or the secure processor 230) does not satisfy the firmware installation condition (e.g. "NO" relating to operation 901), the electronic device may identify whether the firmware installation condition is satisfied.

According to various embodiments, if the electronic device (e.g. the processor 120 or the secure processor 230) satisfies the firmware installation condition (e.g. "YES" relating to operation 901), the electronic device may identify firmware to be installed (or updated) in the electronic device, in operation 903. According to an embodiment, if the main processor 220 satisfies the firmware installation condition, the main processor may transmit a request signal for installing (or updating) firmware to the secure processor 230. If the secure processor 230 has received a request signal for installing (or updating) firmware from the main processor 220, the secure processor may identify firmware downloaded through the main processor 220.

According to various embodiments, the electronic device (e.g. the processor 120 or the secure processor 230) may identify whether authentication information stored in a secure memory is valid, in operation 905. According to an embodiment, the secure processor 230 may determine whether the authentication information is valid, based on an HMAC value of the authentication information stored in the secure memory 240 and a validity time interval of the authentication information. For example, the validity time interval of the authentication information may be determined based on at least one of approval time point information or approval expiration time point information of the authentication information, included in the authentication information. According to another embodiment, the secure processor 230 may determine whether the authentication information is valid, based on an HMAC value of the authentication information stored in the secure memory 240, and the number of times the authentication information has been used. For example, if the number of times the authentication information stored in the secure memory 240 has been used is equal to or smaller than a reference number, the secure processor 230 may determine that the authentication information stored in the secure memory 240 is valid. For example, the reference number may be configured at the time of release of the electronic device 200, or may be configured by a user.

According to various embodiments, if the electronic device (e.g. the processor 120 or the secure processor 230) has determined that the authentication information stored in the secure memory 240 is valid (e.g. "YES" relating to operation 905), the electronic device may identify whether firmware authentication based on the authentication information is successful, in operation 907. According to an embodiment, the secure processor 230 may compare a hash value corresponding to the firmware received from the main processor 220 with a hash value included in the authentication information stored in the secure memory. If the hash value corresponding to the firmware received from the main processor 220 is identical to the hash value included in the authentication information, the secure processor 230 may determine that authentication of the firmware is successful. Additionally, if the hash value of the firmware received from the main processor 220 and the hash value of the authentication information stored in the secure memory are identical to each other, and the version information of the firmware and the version information of the authentication information are also identical to each other, the secure processor 230 may determine that the authentication of the firmware is successful.

According to various embodiments, if the electronic device (e.g. the processor 120 or the secure processor 230) succeeds in authenticating the firmware, based on the authentication information (e.g. "YES" relating to operation 907), the electronic device may update the firmware of the electronic device to the firmware related to the authentication information, in operation 909. According to an embodiment, if the secure processor 230 succeeds in firmware authentication based on the authentication information, the secure processor may transmit a request signal for confirming whether to install the firmware, to the main processor 220. The main processor 220 may control the display device (e.g. the display device 160 in FIG. 1) to display a message related to the determination of whether to install the firmware, based on the request signal received from the secure processor 230. For example, the display device (e.g. the display device 160 in FIG. 1) may display a message 1010 related to the determination of whether to install the firmware, as illustrated in FIG. 10B. For example, if an input corresponding to a cancel button 1014 in the message 1010 displayed in at least a part of the display device, as illustrated in FIG. 10B, is detected, the secure processor 230 may determine that the user does not want to install the firmware at the current time point. The secure processor 230 may identify whether the use environment of the electronic device satisfies the firmware installation condition. For example, if an input corresponding to a confirm button 1012 in the message 1010 displayed in at least a part of the display device, as illustrated in FIG. 10B, is detected, the secure processor 230 may determine that the user wants to install the firmware at the current time point. Accordingly, the secure processor 230 may update the firmware of the electronic device to the firmware related to the authentication information. For example, the secure processor 230 may store the updated firmware of the electronic device 200 in the secure memory 240. As another example, the secure processor 330 may store the updated firmware of the electronic device 300 in the non-secure memory 350 through the main processor 320. The updated firmware may be stored in an active region (e.g. the first region 352) of the non-secure memory 350 together with a signature of the secure processor 330.

According to various embodiments, if the authentication information stored in the secure memory is not valid (e.g. "NO" relating to operation 905), or the firmware authentication based on the authentication information fails (e.g. "NO" relating to operation 907), the electronic device (e.g. the processor 120 or the secure processor 230) may perform user re-authentication of the firmware, in operation 911. According to an embodiment, if an external apparatus (e.g. a server) which has transmitted the firmware is trustworthy, and the version of the firmware is later (higher) than the version of the firmware that is running in the electronic device 200, the secure processor 230 may control the display device (e.g. the display device 160) through the main processor 220 such that the display device displays patch information of the firmware.

According to various embodiments, the electronic device (e.g. the processor 120 or the secure processor 230) may identify whether user re-authentication of the firmware is successful, in operation 913. According to an embodiment, if the secure processor 230 detects a user input corresponding to the patch information displayed in at least a part of the display device before passage of a reference time interval from the time point at which the patch information is displayed in the display device, the secure processor 230 may determine that the user re-authentication of the firmware is successful.

According to various embodiments, if the user re-authentication of the firmware is successful (e.g. "YES" relating to operation 913), the electronic device (e.g. the processor 120 or the secure processor 230) may update the firmware of the electronic device to the firmware, the user re-authentication of which was successful, in operation 909.

According to various embodiments, if the user re-authentication of the firmware fails (e.g. "NO" relating to operation 913), the electronic device (e.g. the processor 120 or the secure processor 230) may output firmware update restriction information, in operation 915. According to an embodiment, if the secure processor 230 fails in user re-authentication of the firmware, the secure processor may transmit firmware update restriction information to the main processor 220. The main processor 220 may control at least one element (e.g. the sound output device 155, the display device 160, or an indicator) to output the firmware update restriction information received from the secure processor 230, to the outside. For example, the display device (e.g. the display device 160) may display a warning message 1020 such as "Unable to update firmware", as illustrated in FIG. 10C.

According to various embodiments, an operation method of an electronic device (e.g. the electronic device 200 in FIG. 2) may include: in a security integrated circuit (IC) (e.g. the security integrated circuit 210 in FIG. 2) including a main processor (e.g. the main processor 220 in FIG. 2) operating in a rich execution environment and a secure processor (e.g. the secure processor 230 in FIG. 2) operating in a secure execution environment, performing user authentication by the secure processor, based on firmware update information received from a server through the main processor; if the user authentication is successful, generating authentication information corresponding to the firmware update information; storing the authentication information in at least a part of a secure memory (e.g. the secure memory 240 in FIG. 2); if corresponding firmware is installed, performing authentication of the firmware, based on the authentication information stored in the secure memory; and if the authentication of the firmware is successful, installing the firmware.

According to various embodiments, the authentication information may be stored in at least a part of the secure memory included in the security integrated circuit.

According to various embodiments, if the secure memory is located outside the security integrated circuit, the authentication information may be encrypted with a security key related to the secure processor, and the encrypted authentication information may be stored in at least a part of the secure memory.

According to various embodiments, the authentication information may include at least one of version information included in the firmware update information, a hash included in the firmware update information, a hash-based message authentication code (HMAC) related to the secure processor, a time related to approval of the authentication information, or an approval expiration time of the authentication information.

According to various embodiments, the performing of the user authentication may include: determining whether signature information of the server, included in the firmware update information, satisfies a designated condition; and if the signature information of the server satisfies the designated condition, performing user authentication of the firmware update information.

According to various embodiments, the performing of the user authentication may include: determining whether signature information of the server, included in the firmware update information, satisfies a designated condition; if the signature information of the server satisfies the designated condition, comparing version information included in the firmware update information with version information of firmware installed in the electronic device; and if a version included in the firmware update information is later than a version of the firmware installed in the electronic device, performing user authentication of the firmware update information.

According to various embodiments, the performing of the authentication of the firmware may include: if an installation condition for the firmware is satisfied, and a request signal is received from the main processor, performing authentication of the firmware, based on the authentication information stored in the secure memory.

According to various embodiments, the performing of the authentication of the firmware may include: determining whether the authentication information stored in the secure memory is valid; and if the authentication information is determined to be valid, performing authentication of the firmware, based on the authentication information.

According to various embodiments, the determining of whether the authentication information is valid may include: determining whether the authentication information stored in the secure memory is valid, based on at least one of an HMAC value, a validity time interval, or a number of times of use of the authentication information.

According to various embodiments, the method may further include: if the authentication of the firmware fails, performing user authentication of the firmware; and if the user authentication is successful, installing the firmware.

According to various embodiments, if an electronic device succeeds in the user authentication of update information related to firmware by using a security integrated circuit, the electronic device may generate authentication information and store the generated authentication information in a secure memory, and update firmware, based on the authentication information stored in the secure memory at a time point for update of the firmware. Therefore, the electronic device can securely and efficiently update the firmware.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a security integrated circuit (IC) comprising a main processor performing a normal operation and a secure processor performing a secure operation; and
a secure memory,
wherein the main processor is configured to control to receive firmware update information and firmware from an external server, and
wherein the secure processor is configured to:
perform user authentication, based on the firmware update information,
based on the user authentication being successful, generate authentication information corresponding to the firmware update information,
store the authentication information in at least a part of the secure memory,
in response to being requested to install the firmware, perform authentication of the firmware, based on the authentication information stored in the secure memory,
based on the authentication of the firmware being successful, install the firmware,
based on the authentication of the firmware failing, perform user re-authentication of the firmware, and
based on the user re-authentication being successful, install the firmware.

2. The electronic device of claim 1, wherein the secure memory is included in the security IC.

3. The electronic device of claim 1, wherein the authentication information comprises at least one of version information included in the firmware update information, a hash included in the firmware update information, a hash-based message authentication code (HMAC) related to the secure processor, a time related to approval of the authentication information, or an approval expiration time of the authentication information.

4. The electronic device of claim 1, wherein the secure processor is configured to:
determine whether signature information of the server, included in the firmware update information, satisfies a designated condition; and
based on the signature information of the server satisfying the designated condition, perform user authentication of the firmware update information.

5. The electronic device of claim 1, wherein the secure processor is configured to:
determine whether signature information of the server, included in the firmware update information, satisfies a designated condition;
based on the signature information of the server satisfying the designated condition, compare version information included in the firmware update information with version information of firmware installed in the electronic device; and
based on a version included in the firmware update information being later than a version of the firmware installed in the electronic device, perform user authentication of the firmware update information.

6. The electronic device of claim 1, wherein, if the secure memory is located outside the security IC, the secure processor is configured to:
encrypt the authentication information with a security key related to the secure processor and
store the encrypted authentication information in at least the part of the secure memory.

7. The electronic device of claim 1, wherein:
based on an installation condition for the firmware being satisfied, the main processor is configured to transmit a request signal for installing the firmware to the secure processor, and
based on the request signal being received from the main processor, the secure processor is configured to perform authentication of the firmware, based on the authentication information stored in the secure memory.

8. The electronic device of claim 1, wherein, the secure processor is configured to:
determine whether the authentication information stored in the secure memory is valid; and
based on the authentication information being valid, perform authentication of the firmware, based on the authentication information.

9. The electronic device of claim 8, wherein the secure processor is configured to determine whether the authentication information stored in the secure memory is valid, based on at least one of an HMAC value, a validity time interval, or a number of times of use of the authentication information.

10. An operation method of an electronic device, comprising:
in a security integrated circuit (IC) including a main processor performing a normal operation and a secure processor performing a secure operation, performing user authentication by the secure processor, based on firmware update information received from a server through the main processor;
generating authentication information corresponding to the firmware update information, based on the user authentication being successful;
storing the authentication information in at least a part of a secure memory;
in response to being requested to install the firmware, performing authentication of the firmware, based on the authentication information stored in the secure memory;
installing the firmware, based on the authentication of the firmware being successful;
performing user re-authentication of the firmware, based on the authentication of the firmware failing; and
installing the firmware, based on the user re-authentication being successful.

11. The operation method of claim 10, wherein the authentication information is stored in at least the part of the secure memory included in the security IC.

12. The operation method of claim 10, wherein, if the secure memory is located outside the security IC, the authentication information is encrypted with a security key related to the secure processor, and the encrypted authentication information is stored in at least the part of the secure memory.

13. The operation method of claim 10, wherein the authentication information comprises at least one of version information included in the firmware update information, a hash included in the firmware update information, a hash-based message authentication code (HMAC) related to the secure processor, a time related to approval of the authentication information, or an approval expiration time of the authentication information.

14. The operation method of claim 10, wherein the performing of the user authentication comprises:
   determining whether signature information of the server, included in the firmware update information, satisfies a designated condition; and
   performing user authentication of the firmware update information based on the signature information of the server satisfying the designated condition.

15. The operation method of claim 10, wherein the performing of the user authentication comprises:
   determining whether signature information of the server, included in the firmware update information, satisfies a designated condition;
   comparing version information included in the firmware update information with version information of firmware installed in the electronic device, based on the signature information of the server satisfying the designated condition; and
   performing user authentication of the firmware update information, based on a version included in the firmware update information being later than a version of the firmware installed in the electronic device.

16. The operation method of claim 10, wherein the performing of the authentication of the firmware comprises: based on an installation condition for the firmware being satisfied, and a request signal being received from the main processor, performing authentication of the firmware, based on the authentication information stored in the secure memory.

17. The operation method of claim 10, wherein the performing of the authentication of the firmware comprises:
   determining whether the authentication information stored in the secure memory is valid; and
   based on the authentication information being valid, performing authentication of the firmware, based on the authentication information.

18. The operation method of claim 17, wherein the determining of whether the authentication information is valid comprises: determining whether the authentication information stored in the secure memory is valid, based on at least one of an HMAC value, a validity time interval, or a number of times of use of the authentication information.

* * * * *